United States Patent
Kalisman et al.

(10) Patent No.: US 10,885,407 B2
(45) Date of Patent: Jan. 5, 2021

(54) METHOD AND SYSTEM FOR THREE-DIMENSIONAL PRINT ORIENTED IMAGE SEGMENTATION

(71) Applicant: SIMBIONIX LTD., Airport City (IL)

(72) Inventors: Oren Kalisman, Tel Aviv (IL); Dan Pri-Tal, Hachamisha (IL); Roy Porat, Tel Aviv (IL); Yaron Vaxman, Petach Tikva (IL)

(73) Assignee: SIMBIONIX LTD., Airport City (IL)

( * ) Notice: Subject to any disclaimer, the term of this patent is extended or adjusted under 35 U.S.C. 154(b) by 73 days.

(21) Appl. No.: 15/821,233

(22) Filed: Nov. 22, 2017

(65) Prior Publication Data
US 2018/0144219 A1     May 24, 2018

Related U.S. Application Data

(60) Provisional application No. 62/425,948, filed on Nov. 23, 2016.

(51) Int. Cl.
| | |
|---|---|
| *G06K 15/00* | (2006.01) |
| *G06K 15/02* | (2006.01) |
| *B29C 64/10* | (2017.01) |
| *B29C 64/386* | (2017.01) |
| *G06T 19/00* | (2011.01) |
| *B33Y 50/00* | (2015.01) |
| *H04N 1/40* | (2006.01) |

(52) U.S. Cl.
CPC .......... *G06K 15/1848* (2013.01); *B29C 64/10* (2017.08); *B29C 64/386* (2017.08); *B33Y 50/00* (2014.12); *G06T 19/00* (2013.01); *H04N 1/40068* (2013.01)

(58) Field of Classification Search
None
See application file for complete search history.

(56) References Cited

U.S. PATENT DOCUMENTS

| | | | | |
|---|---|---|---|---|
| 5,326,659 | A * | 7/1994 | Liu | G03F 1/26 430/320 |
| 6,259,962 | B1 * | 7/2001 | Gothait | B29C 41/36 700/119 |
| 7,604,768 | B2 | 10/2009 | Kritchman | |

(Continued)

FOREIGN PATENT DOCUMENTS

WO   WO 2013/072874   5/2013

OTHER PUBLICATIONS

Lesage et al., "A review of 3D vessel lumen segmentation techniques: Models features and extraction schemes," Medical Image Analysis, www.elsevier.com/locate/media, (2009), pp. 819-845.

(Continued)

*Primary Examiner* — Martin Mushambo
(74) *Attorney, Agent, or Firm* — Pearl Cohen Zedek Latzer Baratz LLP

(57) ABSTRACT

A system and method for converting imaging data, for example, medical imaging data, to three-dimensional printer data. Imaging data may be received describing for example a three-dimensional volume of a subject or patient. Using printer definition data describing a particular printer, 3D printer input data may be created from the imaging data describing at least part of the three-dimensional volume.

4 Claims, 7 Drawing Sheets

(56) References Cited

U.S. PATENT DOCUMENTS

| | | | | |
|---|---|---|---|---|
| 8,848,233 B2* | 9/2014 | Gullentops | ............. | B41C 1/003 358/1.18 |
| 9,129,435 B2* | 9/2015 | Lee | ......................... | G06T 19/20 |
| 2004/0183796 A1* | 9/2004 | Velde | ..................... | B41C 1/00 345/419 |
| 2006/0127153 A1* | 6/2006 | Menchik | ................... | B41J 2/175 400/62 |
| 2007/0286470 A1* | 12/2007 | Bernard | ................. | G06T 7/0012 382/132 |
| 2008/0124475 A1* | 5/2008 | Kritchman | .............. | B29C 41/48 427/421.1 |
| 2009/0092285 A1* | 4/2009 | Keyes | ................... | G06T 7/0004 382/103 |
| 2011/0228236 A1* | 9/2011 | Yanagita | ................ | G03B 25/02 355/18 |
| 2011/0261049 A1* | 10/2011 | Cardno | ................... | G06Q 10/10 345/419 |
| 2012/0158369 A1* | 6/2012 | Bachrach | ................ | G06F 17/50 703/1 |
| 2014/0052415 A1* | 2/2014 | Baran | ...................... | G06F 17/50 703/1 |
| 2015/0057784 A1* | 2/2015 | Butler | ................. | B29C 67/0088 700/119 |
| 2015/0205544 A1* | 7/2015 | Webb | ................. | H04N 1/32539 358/1.15 |
| 2015/0217515 A1* | 8/2015 | Kim | ......................... | G06T 19/00 264/401 |
| 2015/0224716 A1* | 8/2015 | Hemani | ................ | B29C 64/386 700/98 |
| 2015/0297149 A1* | 10/2015 | Park | ......................... | A61B 6/14 345/419 |
| 2016/0042095 A1* | 2/2016 | Chou | ................... | G06F 17/5086 703/1 |
| 2016/0159012 A1* | 6/2016 | Lee | ................... | G05B 19/41865 700/98 |
| 2016/0185045 A1* | 6/2016 | Linnell | ................... | B33Y 50/02 264/401 |
| 2016/0250807 A1* | 9/2016 | Atwood | ................. | B33Y 10/00 264/401 |
| 2016/0257077 A1 | 9/2016 | Brown | | |
| 2016/0267246 A1 | 9/2016 | Assmann et al. | | |
| 2016/0279445 A1* | 9/2016 | Ju | ......................... | A61N 5/1075 |
| 2016/0284104 A1* | 9/2016 | Moroney | ................. | G06K 9/48 |
| 2016/0364844 A1* | 12/2016 | Ivanchenko | .............. | G06T 7/10 |
| 2017/0066195 A1* | 3/2017 | Chu | ......................... | B33Y 10/00 |
| 2017/0106599 A1* | 4/2017 | Astovasadourian | ......................... | G05B 19/4099 |
| 2017/0123407 A1* | 5/2017 | Shiihara | ................. | B33Y 10/00 |
| 2017/0153858 A1* | 6/2017 | Sato | ...................... | G06F 3/1203 |
| 2017/0203515 A1* | 7/2017 | Bennett | ................ | B29C 64/393 |
| 2017/0359315 A1* | 12/2017 | Zhang | ................... | B29C 64/386 |
| 2018/0147784 A1* | 5/2018 | Jiang | ...................... | B29C 64/20 |

OTHER PUBLICATIONS

Gao et al., "Individual tooth segmentation from CT images using level set method with shape and intensity prior," Pattern Recognition, www.elsevier.com/locate/pr, (2010), pp. 2406-2417.

* cited by examiner

Filled segmentation

Initial segmentation

Bone - threshold based segmentation with connected component selected from result Bone - print oriented segmentation

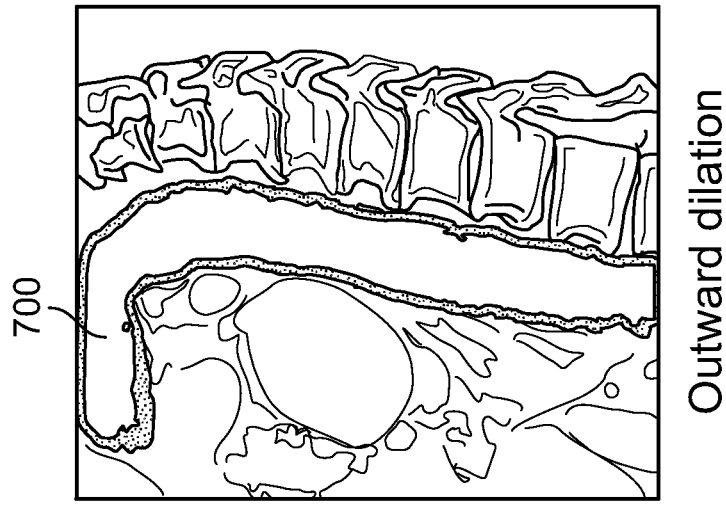
FIG. 7C Outward dilation
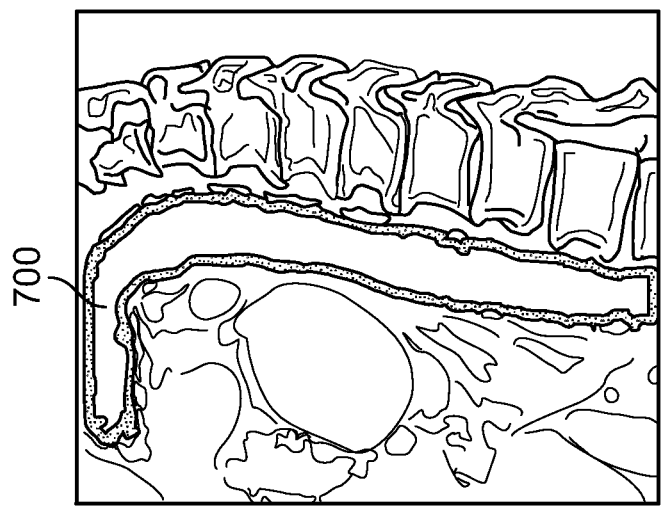
FIG. 7B Inward dilation
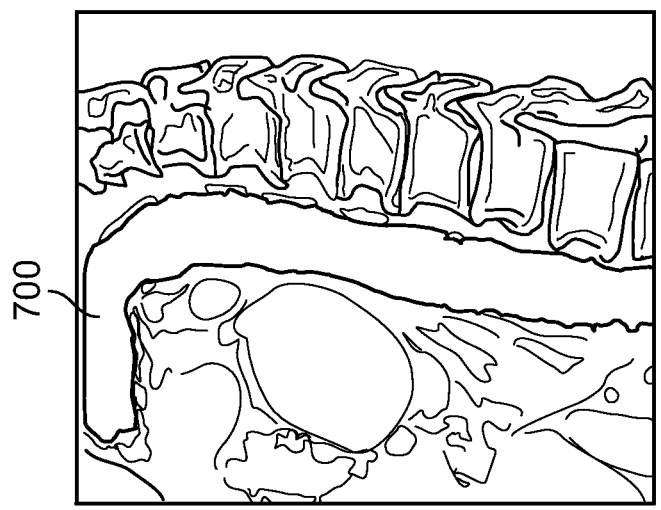
FIG. 7A Initial segmentation

US 10,885,407 B2

METHOD AND SYSTEM FOR THREE-DIMENSIONAL PRINT ORIENTED IMAGE SEGMENTATION

PRIOR APPLICATION DATA

The present application claims benefit from prior provisional application No. 62/425,948 filed on Nov. 23, 2016, entitled "METHOD AND SYSTEM FOR THREE-DIMENSIONAL PRINT ORIENTED IMAGE SEGMENTATION", incorporated by reference herein in its entirety.

FIELD OF THE INVENTION

The present invention is related to three-dimensional (3D) or solid printing systems, and more particularly, to creating, from 3D or other image data to be segmented, 3D imaging definitions or data and printing that data.

BACKGROUND 3D printing systems typically create three-dimensional objects based upon input computer data or definitions by forming sequential layers of material into cross-sectional patterns that are combined along a z-axis (typically up and down, in the direction of forming layers) to form a three-dimensional object. Solid printing systems include systems that build parts by for example stereolithography, laser sintering, fused deposition modeling, selective deposition modeling (e.g. ink-jet deposition), film transfer printing, and others.

A 3D printer may take as input data which defines the object to be printed. Examples of the 3D printer input data or a 3D definition file may include polygon (approximation of a surface with triangles) data such as STL (STereoLithography) format data, AMF (Additive Manufacturing File Format) and VRML (Virtual Reality Modeling Language) format data.

It may be desired to use image data such as 3D medical image data, e.g., Digital Imaging and Communications in Medicine (DICOM) data, CT (computed tomography) data, MR or MRI (magnetic resonance imaging) data, ultrasound data, or stacks of image slices, to create a 3D object. For example, a patient may be imaged, and it may be desired to print a 3D model of all or a portion of the patient's vascular system, heart, spine, etc. Conversion of 3D image data to 3D printer data may not be straightforward: for example different 3D printers have different characteristics, and the conversion may not take into account these characteristics.

SUMMARY

A system and method for converting imaging data, for example, medical imaging data, to three-dimensional printer data. Imaging data may be received describing for example a three-dimensional volume of a subject or patient. Using printer definition data describing a particular printer, 3D printer input data may be created from the imaging data describing at least part of the three-dimensional volume.

BRIEF DESCRIPTION OF THE DRAWINGS

The subject matter regarded as the invention is particularly pointed out and distinctly claimed in the concluding portion of the specification. For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The specification, however, both as to organization and method of operation, together with objects, features, and advantages thereof, may best be understood by reference to the following detailed description when read with the accompanying drawings in which:

FIGS. 7A, 7B and 7C show a model before and after dilation according to one embodiment of the invention.

Figure 1:
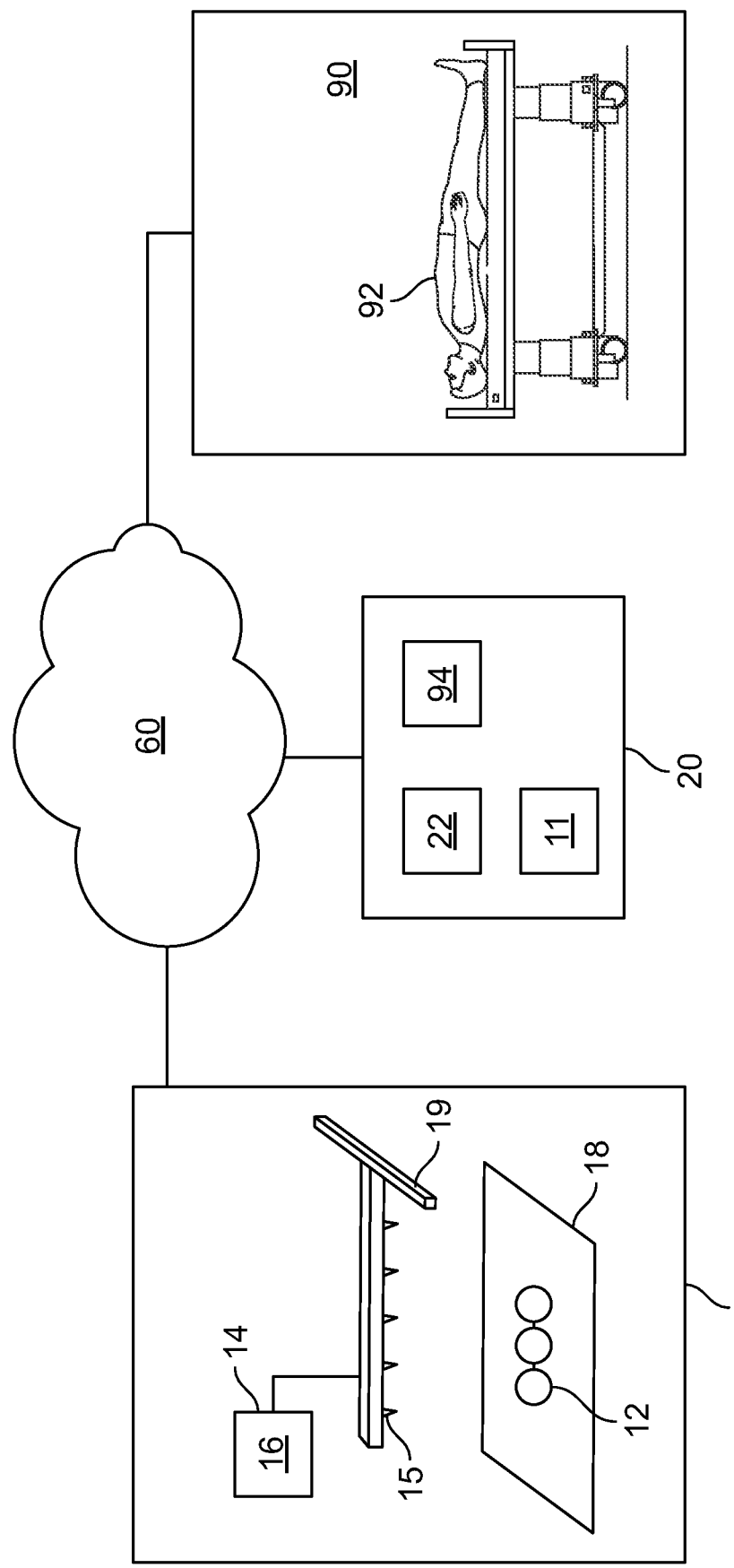
FIG. 1 is a schematic block diagram illustration of a computing device according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

References to "one embodiment", "an embodiment", "demonstrative embodiment", "exemplary embodiments", "various embodiments" etc., indicate that the embodiment(s) so described may include a particular feature, structure, or characteristic, but not every embodiment necessarily includes the particular feature, structure, or characteristic. Repeated use of the phrase "in one embodiment" does not necessarily refer to the same embodiment, although it may. Certain embodiments may include features from different descriptions of embodiments: for example, a system and method may use thickening and/or void creation and/or resolution adjustment, etc.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments of the invention may perform "print-oriented" segmentation ("POS") or data conversion. Embodiments may convert imaging data, e.g., representing a 3D volume, to 3D printer data, by inputting imaging data describing a 3D volume of a subject (e.g. a human patient) and, in a POS process, using or according to printer definition data (e.g., describing a particular printer desired to be used for printing, printer settings for a particular print job, print material to be used for a job, or other parameters) creating from the imaging data 3D printer input data describing at least part of the three-dimensional volume. The imaging data may be segmented, which typically involves conversion from medical imaging data to a mask, a 3D matrix including for example a 1 where 3D material should be printed, and for example a 0 where material is not printed. Other suitable data structures may be used. Segmenting may include dividing the volume into parts to be printed, and/or selecting certain parts to be printed (e.g. according to user input). Segmenting may be performed for example by thresholding, and/or specific known tools or algorithms designed for specific types of structures. For example, a known tool or module may segment to divide the imaging data to different bones, and a known tool or module may segment to divide the imaging data to different soft-tissue organs. Segmenting may produce one or several masks—e.g., one mask per vertebrae or one mask per tooth. Known conversion or segmentation methods may include for example known tooth segmentation (e.g., "Individual tooth segmentation from CT images using level set method with shape and intensity prior", Hui Gao and Oksam Chae, Pattern Recognition, Volume 43, Issue 7, July 2010, pp. 2406-2417) and vessel segmentation (e.g. "A review of 3D vessel lumen segmentation techniques: Models, features and extraction schemes", David Lesagea, Elsa Angelini, Isabelle Bloch, Gareth Funka-Lea, Medical Image Analysis, vol. 13, issue 6, December 2009, pp. 819-845).

Segmenting is performed typically prior to the conversion to printer data. The printer input data may then be used by the printer to print and create the 3D object. Prior art segmentation and data conversion is typically done unrelated to and not taking into whether the segmented data will be 3D printed and/or account for printer characteristics, resulting in poor quality printing. For example, the printer when receiving such a print job may provide a notification that the segmentation is not good enough, because for example parts are too thin, or are missing connected parts. In contrast, embodiments of the present invention may perform a segmentation or data conversion process which takes into account that the output is meant for specific 3D printer with a set of specifications. A 3D model may be created which uses the 3D printer specification (constraints and/or advantages) to achieve the most suitable printed model in an efficient manner. This may reduce or eliminate problems such as weak sections, inaccurate parts, or a "pixelized" model, which may occur if the specific printer is not accounted for. Embodiments of the present invention may in particular be advantageous when used with medical grade volumes, such as defined by DICOM, MR or CT data, but embodiments of the invention can work with other data, such as non-medical imaging data.

FIG. 1 describes a system according to one embodiment of the present invention. Imaging system 90 may image a subject 92 (e.g. a human patient) to produce image data 94 (representing the subject, or a portion of the subject) such as 3D medical image data, e.g., CT data, MR or MRI data, ultrasound data, stacks of image slices, or other image data, and may be for example, a CT system or an MRI system. Other medical or non-medical imaging systems may be used. While medical imaging or imaging data is described herein, other imaging systems may be used, and imaging data used herein may be artificially created without imaging a specific object. For example, the input data can be 3D objects. The 3D objects can include 3D imaging data, mesh data, volumetric objects, polygon mesh objects, point clouds, functional representations of 3D objects, cad files, 3D pdf files, STL files, and/or any inputs that can represent a 3D object. The 3D imaging data can include medical imaging data, including CT data, Cone Beam Computed Tomography ("CBCT") imaging data, MRI data and/or MRA imaging data (e.g., MRI with a contrast agent) or ultrasound imaging data. The 3D objects can be of anatomy (e.g., complex anatomy), industrial data, or any 3D object.

Imaging system 90 may send or transmit image data 94 to a computer 20, e.g. a personal computer, workstation, etc. Computer 20 may process image data 94, taking into account or being according to printer definition data 22, and output 3D printer input data 11, e.g. a 3D mesh, 3D definition file, PLY (Polygon File Format), STL (STereoLithography), AMF (ASTM Additive Manufacturing File Format), VRML (Virtual Reality Modeling Language), or other data, to a 3D printer 10, which may print the data as a physical real-world 3D printed object 12. While image data 94, printer definition data 22 and 3D printer input data 11 are shown being stored by computer 20 (e.g., in memory 40, FIG. 2), such data may if appropriate be stored or shared by the devices of FIG. 1 including imaging system 90 and printer 10. For example, imaging system 90 may generate image data 94 (which may be generated in another manner, and which may come from another source) and may send or transmit image data 94 to computer 20, which may create 3D printer input data 11 and send or transmit data 11 to 3D printer 10.

3D printer 10 may use various methods to use input or build material (e.g., photopolymer or other material) to produce a physical, real-world, 3D printed object 12, the printing of which may be defined or discussed with respect to X/Y/Z axes, the Z axis defining the vertical relationship of a set of layers of deposited material.

Figure 2:
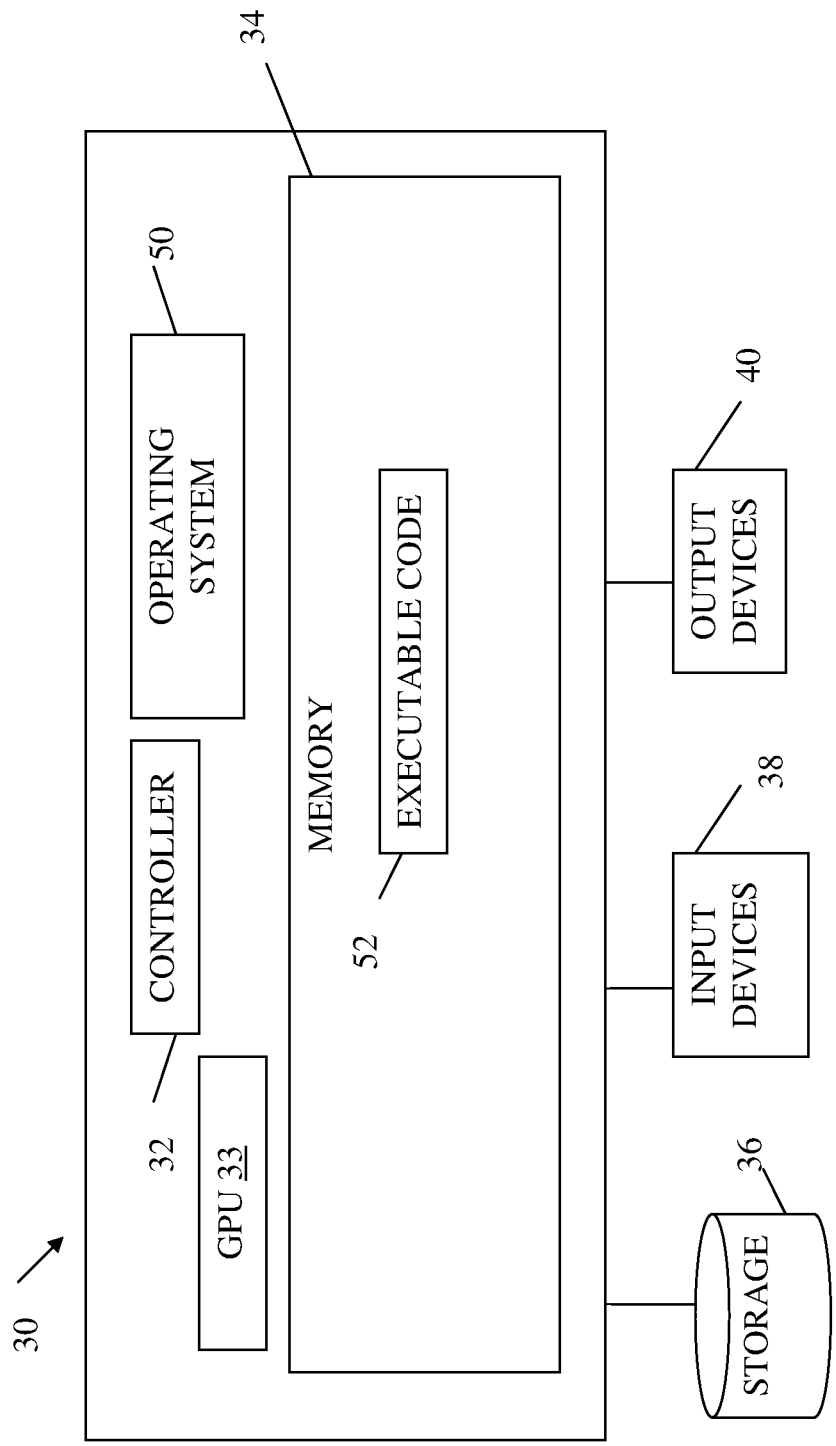
FIG. 2 is a schematic block diagram illustration of a system according to an embodiment of the present invention.

Each of imaging system 90, computer 20 and 3D printer 10 may include computing components such as some version of components described in FIG. 2, and may be connected by for example network 60. In other embodiments not all components shown may be used. For example, imaging data may be input to computer 20 not directly from an imaging system 90, rather for example via flash drive, disk, etc. Components may be combined: for example the functionality of computer 20, described as converting image or imaging data 94 to 3D printer data 11, may be incorporated in 3D printer 10.

In one embodiment 3D printer 10 may include for example a cartridge 14 including a supply of object creation build material 16 that can be selectively dispensed onto a tray 18. The tray 18 holds the solid printing material used to build the 3D object 12 during the build process. The solid printing material can be in one embodiment any photocurable material known in the art or devised hereafter. Examples of printing or object creation materials suitable for use with various embodiments of the present invention include for example photocurable materials, plastic, and metal. The solid printing material 16 may be dispensed from the cartridge 14 through one or more dispensers, ink-jets, or selectively openable valves 15 on a bottom wall of the cartridge. A movement apparatus such as a shuttle 19 may move dispensers or valves 15 back and forth generally along the x-axis and/or y-axis of the solid printing apparatus 10, and possibly move dispensers or valves 15 up and down along the z-axis to create layers. Other embodiments of the present invention include alternative devices for dispensing printing material into the tray. Other embodiments need not use selective deposition or the specific component shown; for example 3D printer 10 may use a system deposits a binder material onto a powder bed with inkjet printer heads layer by layer, or SLS (selective laser sintering) where a laser sinters powdered material.

FIG. 2 describes computing components which may be part of for example printing system 90, computer 20 and 3D printer 10. Computing device 30 may include a controller 32 that may be, for example, a central processing unit processor (CPU), a chip or any suitable computing or computational device, a general processing unit (GPU) 33, an operating system 50, a memory 34, a storage 36, input devices 38 and output devices 40.

Operating system 50 may be or may include any code segment designed and/or configured to perform tasks involving coordination, scheduling, arbitration, supervising, controlling or otherwise managing operation of computing device 30, for example, scheduling execution of programs. Memory 34 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 34 may be or may include a plurality of, possibly different, memory units. Executable code or software 52 may be any executable code, e.g., an application, a program, a process, task or script. Executable code or software 52 may include for example segmentation algorithms or processes, processes to convert image data to 3D print specification data, etc. Executable code 52 may be executed by controller 32 possibly under control of operating system 50. For example, executable code 52 may be an application performing methods discussed herein. Controller 32 may be configured to carry out methods discussed herein by for example executing code 52.

Storage 36 may be or may include, for example, a hard disk drive, a floppy disk drive, a Compact Disk (CD) drive, a CD-Recordable (CD-R) drive, a universal serial bus (USB) device or other suitable removable and/or fixed storage unit.

Input devices 38 may be or may include a mouse, a keyboard, a touch screen or pad or any suitable input device. It will be recognized that any suitable number of input devices may be connected. Output devices 40 may include for example one or more displays, speakers and/or any other suitable output devices. It will be recognized that any suitable number of output devices may be operatively connected.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, cause the processor or controller to carry out methods disclosed herein.

Figure 3:
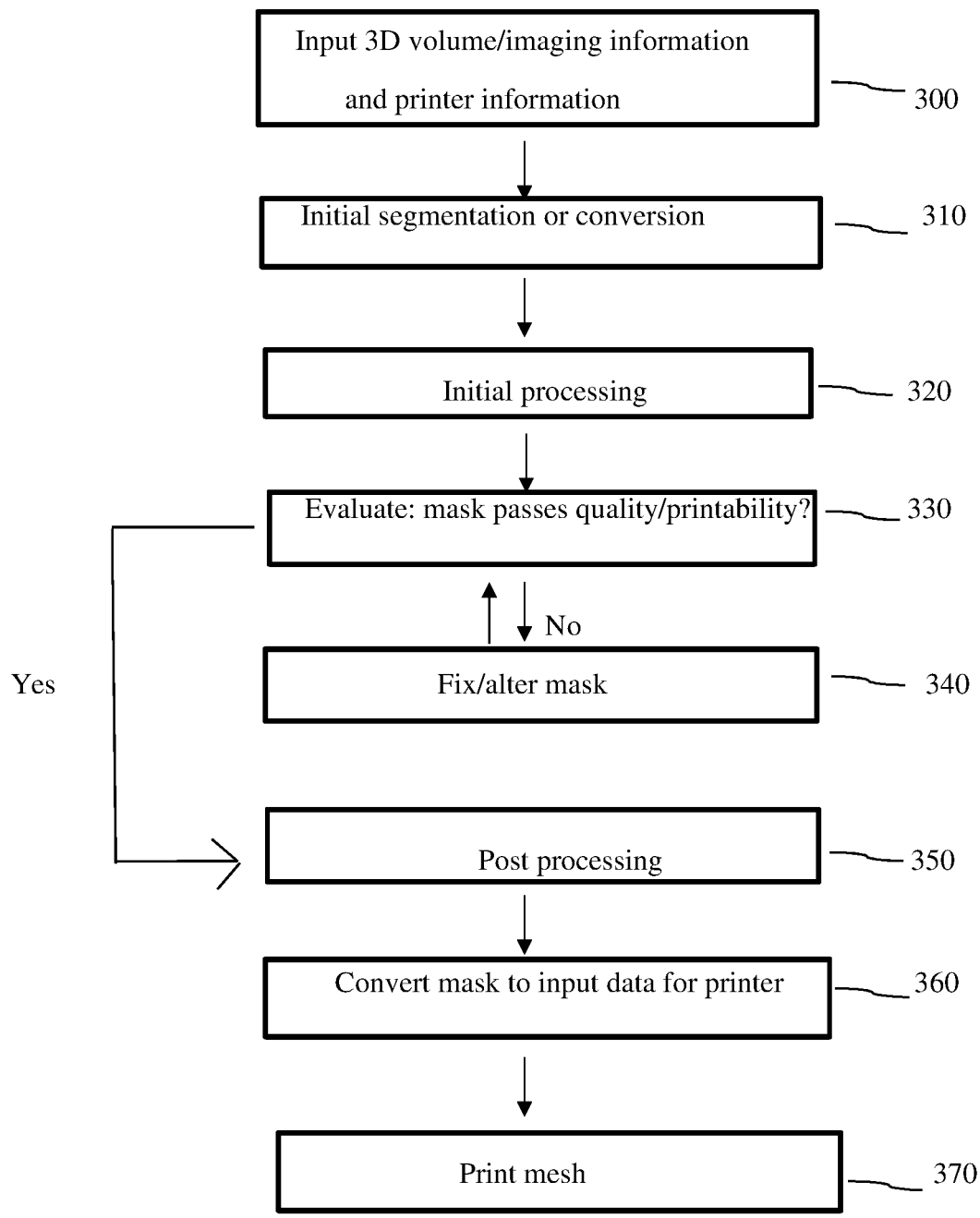
FIG. 3 is a flowchart describing a method according to one embodiment of the invention.

FIG. 3 is a flowchart describing a method according to one embodiment of the invention. In operation 300 imaging information and/or printer information may be input. For example, a 3D volume (e.g., image data 94 such as 3D image or imaging data) and printer specification or definition data 22 (e.g. describing a particular printer, materials used, etc.) may be input. Also input may be for example data describing the image data, such as resolution. In operation 310, an initial segmentation, processing or conversion may be performed. Initial segmentation may convert the 3D volume into one or more masks 24, which may be initial masks. Segmentation may include identifying features such as in-vivo features (e.g., different bones, organs, teeth, etc.) and dividing the mask or masks according to different features. Various segmenting algorithms and designated tools may be used, such as thresholding segmentation. Initial processing 320 may include processing such as resolution changes, filling voids, erosion or removing a border between touching masks. Certain operations may be combined: e.g. segmentation 310 may incorporate resolution changes. Initial processing 320 may take into account printer specification or definition data 22.

In operation 330, the output of prior operations (e.g. one or more masks) may be evaluated for, for example, quality, strength, and/or printability. In operation 340, if the mask, or a portion of the mask, is not printable, or fails some quality test, it may be adjusted, altered or fixed, possibly without tampering with precision, e.g., the "fixes" may be the same resolution as that of the printer. Evaluation and alteration or adjustment may be iterative or repeated. Typically, evaluation 330 is performed again after adjustment 340.

In operation 350, if the mask is printable, post processing may be performed on the mask, for example known operations such as smoothing or morphological operations such as dilution or erosion. In some embodiments, the output of post processing may be to evaluation, operation 330, to determine if post processing resulted in a printable or non-printable mask. In operation 360, the mask may be converted to data describing at least part of the 3D volume that may be input or sent to a printer; for example the mask may be converted to a mesh. In operation 370, the mesh may be printed by a 3D printer.

In one embodiment of the invention, image data 94 (e.g., 3D image or imaging data) may be converted to 3D printer input data 11 (e.g., a mesh) while taking into account or being according to printer specification or definition data 22. For example, printer input data may be created from (e.g., be converted from) image or imaging data 94 which may describe at least part of the 3D volume, or allow a 3D printer to print at least part of the 3D volume. Imaging data may be for example a volume including 3D colored or grayscale data which may require segmentation (e.g. DICOM images of CT or MR, a series of two-dimensional (2D) images). A 3D printer may then print a 3D object or objects which correspond to the printer input data, and the imaging data or the 3D volume. Printer specification or definition data 22 typically describes the specific printer or type of printer that a user intends to be used for a certain print job. Printer specification or definition data 22 may describe the operating parameters, resolution, tolerances, accuracy, etc. for a particular 3D printer and/or a particular model of printer.

Printer specification or definition data 22 may include data on the particular print material a target printer (e.g., the printer intended to be used or a printer selected to be used by a user) is using, and certain printers may use different material. Thus printer specification or definition data 22 may include data describing a particular printer and the variant of material it is intended to use for a particular job. The conversion may include segmentation: identifying features such as in-vivo features (e.g., organs, vascular systems, parts of organs, bones, etc.) and creating for example one or more masks 24. Each mask 24 may represent for example a different object within the volume to be printed, organ, body part to be printed, bone, etc Image data 94 may describe or depict a three-dimensional volume of a subject (e.g., a patient, although non-living objects may be subjects in some embodiments). However, image data 94 need not be complete 3D data; for example a set of 2D slices may form image data 94 and may describe a 3D volume. For example, CT data may be input which may be a bed of 2D slices, where the distance or spacing between each slice is known.

Prior to conversion to printer data, the image data may be divided up or segmented into one or more parts (e.g., organs, tissue) desired to be printed; extraneous image data (e.g., an internal body volume not to be printed, such as an organ or tissue irrelevant to a user) may be excluded. The dividing or segmenting may produce one or more imaging data segments or portions (e.g. masks), and each of these imaging data segments or portions may be converted to printer input, specification or definition data, each segment representing an object to be printed. A mask 24 or other data structure may be used, or may be produced or created as the output of the segmenting. Mask 24 may cause only the portion of the imaging data defined by the mask to be converted to 3D printer input data. For example, the image data may be a volume, such as a patient's chest, including tissue a user wants to convert to a 3D object (e.g. the heart), and tissue the user does not (e.g., lungs, connective tissue, bones, skin, etc.) Mask 24 may define that object or organ to be printed. The mask may be, in one embodiment, a data structure representing a volume or region the same size or volume as that which the image data 94 describes, with Boolean values (e.g., 1/0, true/false, although other values may be used) describing for each voxel in image data 94 if it should be converted to a 3D object. In one embodiment, the mask may initially include all false/0 values, and the voxels/portions to be printed may have values changed to true/1. If voxels are not used, mask 24 may operate on image data 94 in another way, for example including Boolean values corresponding to portions of image data 94, or another method. For example, 1 may indicate include in a 3D object, and 0 may indicate do not include. Multiple masks 24 may be used, each corresponding to an object: for example, one mask may correspond to and cause to be printed one chamber of the heart, and another mask may correspond to and cause to be printed another chamber of the heart.

In one embodiment, a workstation such as computer 20 may receive printer specifications such as printer definition data 22 from a printer 10, or may include printer definition data 22, or for example multiple sets of printer definition data 22, one for each of a number of specific printers or printer models. Computer 20 (or the device performing segmentation) may be provided with segmentation tools or algorithms such as automatic bone segmentation, for example stored in memory 34 or storage 36.

Computer 20 may include, or may receive printer definition data 22, e.g. from printer 10 using, e.g., a driver installed on computer 10. Files or software stored on computer 10 may include such data, which may for example be installed or updated for each supported printer; such data need not be received from a printer. Printer definition data 22 may include data for each printer that might be used or selected by a user, for example, spatial resolution, layer thickness \ Z axis resolution data (e.g., the distance between layers printed by the printer), print tolerance (e.g., accuracy), the printer model or type, the printer technology used by the target printer, (e.g. SLA, digital part materialization (DPM), fused deposition modelling (PDM), etc.), material used (which may be used to derive or look up material strength; material strength may be known as a separate parameter), etc.

A user providing input to computer 20 may choose a certain 3D printer (e.g., a system may receive user input via for example input devices 38), with corresponding printer definition data 22, and may in some embodiments enter a separate material selection to be used with the printer, or may input printer definition data 22.

Computer 20 may receive a volume to be processed and/or segmented, such as image data 94, from for example an imaging system 90, or from another source. In one embodiment, the data conversion from image data 94 to printer input data 11, including segmentation, may take place on computer 20, but in other embodiments processes may take place on for example 3D printer 10. Computer 20 may use the segmentation or division tools and other algorithms (e.g. executed by or on controller 32) and output one or more masks 24.

In one embodiment, a user may select how the segmentation takes place: for example a user may decide that the heart should be segmented to produce one physical 3D object, or may decide that the heart should be segmented to produce several physical 3D objects, according to sections of the heart. A user may for example click (using a pointing device) on a displayed region to provide a seed point, and a known algorithm such as the connected components algorithm may use the seed to select a feature such as an organ or bone. Using known algorithms, mask(s) may be created, for example one mask corresponding to each organ, bone, or organ portion (e.g. chamber of the heart). Other user input into the segmentation process may be received. A user may provide such input to computer 20 via e.g., input devices 38, and a system may receive user input via for example input devices 38.

Various known segmentation algorithms or processes may be used. For example, thresholding may be used, where for each voxel in the input volume, if it inside a required value range, or above or below a threshold, it is segmented—e.g., marked it in the mask as true or "print". Other suitable segmenting algorithms may be used.

Mask(s) 24 may be the output of a division or segmentation process and may include for example 3D Boolean data which may indicate where the 3D model or model sections exist with reference to the volume.

Each mask 24 may for example be a data object which represents an object possibly in a set of related objects. For example, a first mask may be a first section of a heart, and a second mask may be a second section of a heart. In some embodiments, masks or segmentation need not be used. For example the conversion processes discussed herein may operate on data without segmentation.

Computer 20 may use the masks, or apply the masks to the image data 94, and convert the data to a 3D print volume definition or 3D model construct, e.g. create or calculate a 3D print volume definition, 3D model construct, mesh, etc. e.g. in the form of 3D printer input data 11, and send the data to printer 10. The printer may then print the 3D object using for example the 3D printer input data 11.

One or more operations may be used, alone or in combination, to convert, or while converting, image data to printer input data. For example, a POS processes may include increasing resolution, adjusting layer thickness, fill or boundary thickening, dealing with complex mask structures, separating structures which have a real-world connection, and connecting parts for printing.

In various embodiments, as part of initial segmentation (e.g., operation 310) designated tools bone segmentation or other segmentation may be performed. For example a known threshold algorithm may use bone values (e.g. converting voxels in imaging data based on MinThresVal=100HU, MaxThresVal=1000HU for CT modality; HU=Hounsfield unit). Bone segmentation algorithms may return or identify the inner parts of the bones as part of the segmentation process. A segmentation process for such a result may be for example an alpha expansion algorithm over graph to distinguish between desired bone, other bones and background. An alpha expansion algorithm may include an algorithm which optimizes the separation of data (for example "bone" and "not bone").

Figure 6A:
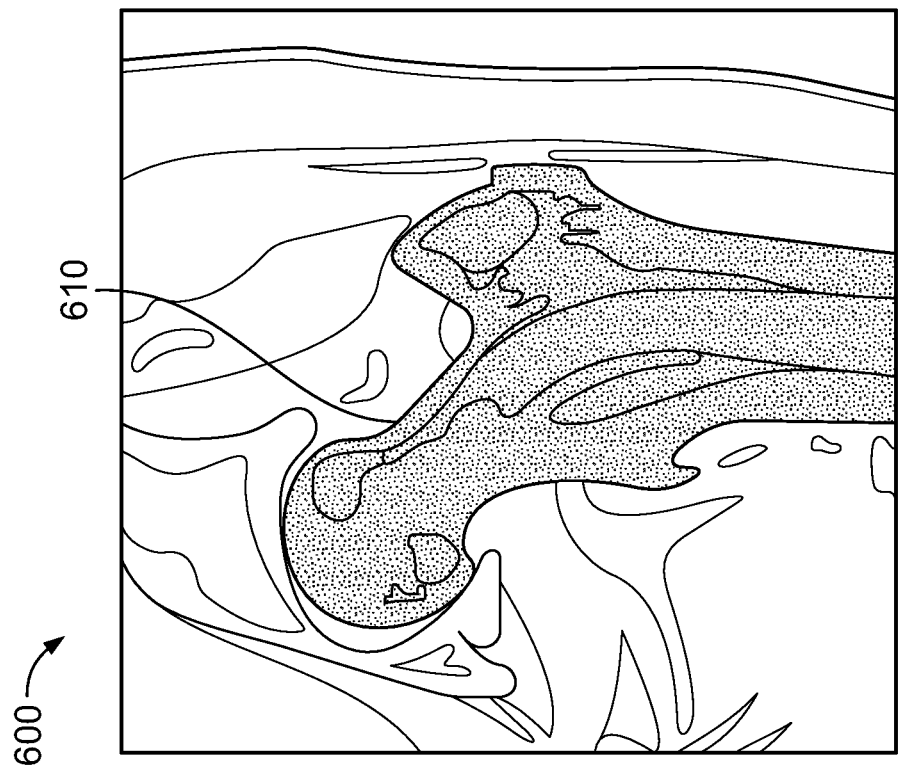
FIGS. 6A and 6B show a 2D representation of a 3D volume with bone segments according to one embodiment of the invention.
Figure 6B:
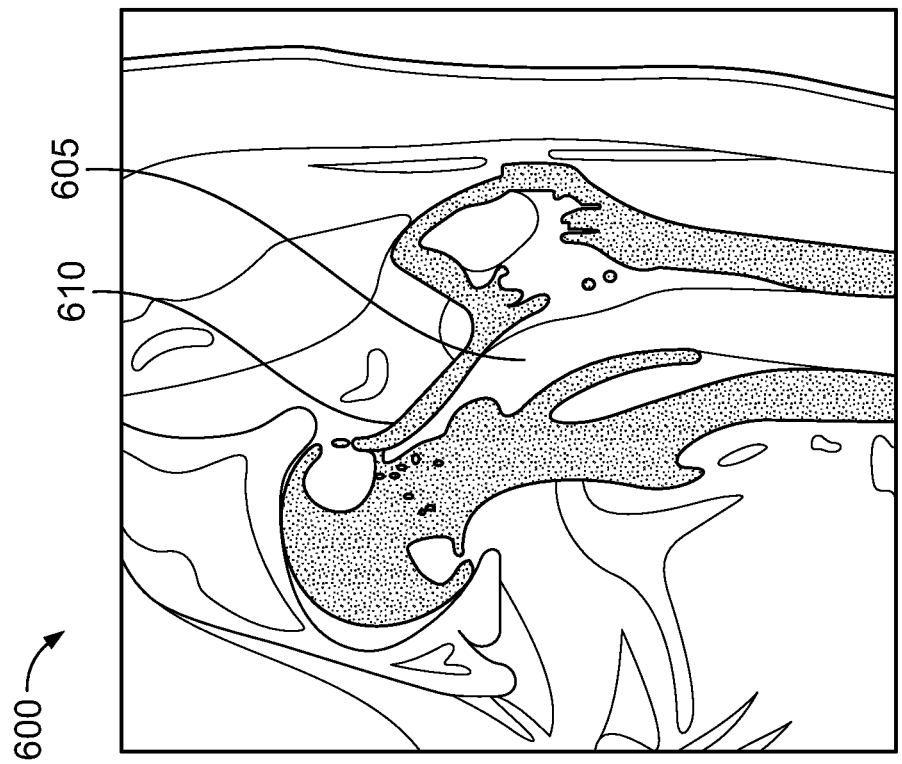

FIG. 6A shows a 2D representation of a 3D volume 600 having bone segment 610 identified. FIG. 6A shows the result of threshold based segmentation with connected components selected from the result. FIG. 6B shows a 2D representation of a 3D volume 600 having bone segment 610 identified. FIG. 6B shows print oriented segmentation according to one embodiment, where gaps and holes 605 are filled to create a more printable and stronger object.

Other segmentation may be performed, e.g., separating portions of organs (e.g., chambers of the heart) or separating different organs.

Adjusting Resolution

In various embodiments, as part of initial processing (e.g. operation 320 above) the 3D printer input data may have a resolution or required resolution (e.g., volume resolution) modified, which is related to the printer's capabilities and resolution. For example, the printer, and thus its related input data, may have a resolution described for example as printer tolerance, distance between layers, size of voxels, number of x, y or z lines or voxels, etc. Creating 3D printer input data may include adjusting the resolution of the mask that is output according to the printer definition data describing the printer, or describing printer settings. For example, after obtaining segmentation, the segmentation result can be smoothed in higher resolution (e.g. same or above the printer accuracy).

The initial input volume may be for example medical input data or image data 94 (e.g. CT, MR data). This volume may be made up from voxels which have certain dimensions (for example depending on the modality, medical protocol, scanning equipment, etc.). The resolution of this initial medical input data volume or image data 94 may be changed, which in turn may change the resolution of the mask.

Printer tolerance may be taken into account when changing resolution. In one embodiment a process may consider the printer tolerance (e.g. accuracy of the printing on the printing plane) and layer thickness (e.g. accuracy of the printer in the z direction) as the printer resolution. A 3D printer typically prints layer by layer, according to for example a mesh, or voxel data. The height of each layer is the layer thickness. The 3D printer should place a material in a specific x,y position, e.g. according to voxels. However, 3D printers may not be accurate, placing material instead at x+T,y+T, where T is the tolerance (e.g., T could be in the range of mm or micrometers). A tolerance may exist in the z/thickness/layer direction, and may have a different value than the tolerance for x and y. A tolerance (e.g., a set of tolerances for X/Y/Z) for a particular printer, or model of printer, may be known. The tolerance and layer thickness may be known or estimated by the user, and may be taken into account.

Layer thickness and tolerance may make up the "printer resolution", similar to volume resolution. The 3D printer should have information or "know" if for any particular point in space material should be printed or not. The minimal dimension (or resolution) of the point in space (in the 3D print build area) is the layer thickness and tolerance. If the input medical volume resolution is "adjusted" or conformed to the printer resolution (e.g. layer thickness and tolerance) better printing, or better POS may be achieved.

For example, if the 3D printer selected or described by the printer definition data has higher resolution than the volume to be imaged, interpolation could be done to increase the resolution of the volume so each voxel in the volume is the same or above the printer accuracy.

A function such as ResizeFun(VolumeInput,ResizeVector) may be used, which may be any function well known in the art which interpolates the medical imaging volume or the mask to increase or decrease the resolution (e.g., if the input volume has a higher resolution than that of the printer). A suitable known function includes the multimodality non-rigid demon algorithm image registration shown at MathWorks.com.

Such a function may accept as input VolumeInput which may be the volume to resize which may be a 3D mask or 3D volume and ResizeVector which may be resize parameters which indicate the change size in each dimension.

The resize vector may be or include dimensionless number(s) indicating the resolution factor between the printer resolution and volume resolution. For example if the printer resolution is (1,1,0.5) in [mm (which of course can be in other dimensions)] and the volume resolution is (2,2,2) also in [mm] (which of course can be in other dimensions) the resizeVector is (2,2,4) with no dimensions (no units).

In one embodiment, ResizeVector=VolumeResolution/PrinterResolution.

In one embodiment, if it is assumed:
VolumeInput has the following resolution Rx,Ry,Rz and width, depth, height (number of rows, column and slices);
The data is from for example a DICOM file:
Rx and Ry are referred to DICOM tag (0028,0030) PixelSpacing [mm]
Rz may be DICOM tag (0018,0050) SliceThickness or the difference between the slice locations as described by DICOM tag (0020,1041) (both in [mm]).
The printer tolerance may be PrTol and layer thickness of PrLay which are in [mm] but which can be other dimensions, e.g., inch, micrometer, etc.

In such an example, the resize vector ResizeVector=[Rx/PrTol, Ry/PrTol, Rz/PrLay] (for each dimension there may be a different value).

In one embodiment ResizeFun may be a known function such as the Matlab function Vq=interp3(X,Y,Z,VolumeInput, Xq,Yq,Zq).

Where for example:
[X,Y,Z]=meshgrid(0:Rx:width*Rx, 0:Ry:depth*Ry, 0:Rz:height*Rz);
[Xq,Yq,Zq]=meshgrid(0:ResizeVector(1): width*Rx,
0:ResizeVector(2): depth*Ry,
0:ResizeVector(3): height*Rz);

In one embodiment, [X,Y,Z]=meshgrid(x,y,z) which returns 3-D grid coordinates based on the coordinates contained in vectors x,y and z. The grid represented by X, Y, and Z has size length(y)-by-length(x)-by-length(z). Meshgrid may be a known function such as a Matlab function described above needed as a preprocessing for the interp3 function.

In one embodiment, VolumeInput may have resolution Rx,Ry,Rz. The printer tolerance may be PrTol (e.g., the printer resolution in the printer "axial" dimension, the z direction) and layer thickness PrLay (e.g. Rz but of the printer). In one implementation:

ResizeVector=[Rx/PrTol, Ry/PrTol, Rz/PrLay]

For each dimension there may be a different value. As with all formulas, data structures, and specific sequences described herein, other or different formulas, other data structures, and other sequences, may be used.

Fill or Boundary Thickening/Printability Evaluation/Fix or Alter Mask

In various embodiments, creating 3D printer input data may include evaluating a 3D mask to determine if it is printable, and/or curing problems detected, such as increasing or decreasing thickness of sections of the printer input data, or features or structures to be printed (to increase or decrease thickness of corresponding sections of a 3D object), according to or taking into account the printer definition data. Creating 3D printer input data may include creating voids or holes in a solid area according to the printer definition data, for example, to reduce the amount of material used.

When segmenting or printing hollow or thin regions, the 3D printed model in these regions might not be strong enough. Embodiments of the invention may detect such regions and automatic morphological operations may be performed in order to increase the model strength.

3D printed object 12 should not break or collapse. If the boundary (wall thickness) of 3D printed object 12 is too thin and/or made from a material which cannot hold itself in the particular model (relating to material strength) the model may break during printing or soon after. If the printing material 16 strength and/or other properties are known during the segmentation or data conversion, the width or thickness of sections of the 3D printed object 12 can be decided for example during POS. There may be a similar process of "wall thickness analysis" and "boundary" thinning or widening on the mesh or 3D printer data 11. This is a known and fast process, and in some embodiments it is may be performed in POS, on the mask, and not later as a mesh. Strength analysis done as a POS process—e.g., on the mask—can produce a result that better matches the raw data, undergoing less transformations, when compared to strength analysis done on a mesh.

Printer definition data 22 (e.g. printer technology) may influence the material. Printer definition data 22 may affect filling and other processes in that thickening, thinning, adding and removing material may be done for example in increments of printer resolution.

Strength analysis (e.g., StrAn, discussed below) may be done on a mask, model or volume to be printed (e.g., CompleteMask—which may be defined as the final mask to be printed), and is typically done after segmentation.

Printability evaluation may be performed with different levels of accuracy. For example a general model printability check (e.g. a "Yes" or "No" answer—does this model could be printed) may be used, or the result can be location specific, for example a data structure such as a "heat map" which indicates what areas of the model could be printed. Known algorithms may use known characteristics of the material used for building to determine if a certain portion is too fragile after building. For example, a portion of a model of a certain thinness may be determined to be too fragile if made of plastic, but not if made of metal. A portion of a model connecting to larger portions may be determined to be too weak if made of plastic, but not if made of metal, and this of course may depend on the size of the portions connected.

A mathematical model for the heat map could be for example: MaskInput may be a Boolean mask, e.g. an initial mask, used as an input to generate a strength analysis process (e.g., using StrAn, discussed below) which returns a data structure such as a "heat map" called for example HeatMap, describing if the input mask is print ready or not, and if not at what regions.

Heatmap=StrAn(MaskInput). Heatmap may be a volume the same size of the MaskInput: with values such as 0 for no material and a floating point number to indicate strength, determined for example based in part on the amount of material in neighboring voxels and the local structure.

In some embodiments Heatmap(~MastInput)=0; (anywhere there is not mask, the heat map is zero—not "interesting").

As part of an example output, any voxel in Heatmap which meets or is Heatmap>StrThres is able or permissible to be printed. The input to a "yes" (print) or "no" (cannot print) option has the same mathematical model—a model can be printed only if all voxels in Heatmap>StrThres.

StrAn may be any known strength analysis function or process, such as for example wall thickness analysis, finite element analysis (FEA, also known as finite element method (FEM)), or other tools. Such methods include known techniques and may work on the mesh.

A different method for StrAn process may include for example that printability is evaluated by manufacturing a mesh from the mask data and performing strength analysis using algorithms known in the art. An example flow of evaluation may include for example:

Convert initial mask to a mesh (e.g., using a known method such as marching cubes; and perform mesh analysis (using e.g. a known method, e.g. wall thickness analysis or FEA). A printability check could also be performed on a mask. This may make the process simpler (e.g., no need to create mesh).

Strength analysis may depend on the model (structure, wall width etc.) and on the printer (printer type, printer material). This may be evaluated during StrAn and the StrThres may be determined by these factors.

In one embodiment, a new or additional mask (e.g., WeakMask) may be created to mark areas to be printed, which in the original print definition are not to be printed, but which are found to border weak areas. Thus weak areas below certain threshold (e.g., a threshold of thickness or predicted strength) may be marked as a new mask, for example:

WeakMask=StrAn<StrThres

WeakMask may be a new mask which is defined by every voxel in the StrAn (or the "Heatmap" which may indicate which areas of the model can be printed and which areas need adjustment due to for example strength issues) which is below StrThres value.

Morphological dilation (MorphoFun) may be defined as for example:

MorphoMask=DilationFun (WeakMask)

MorphoMask may be the mask produced after the dilation process (DialtionFun) performed on WeakMask defined above.

and the MorphoMask may be combined or united with CompleteMask:

CompleteMask=MorphoMask U CompleteMask

To perform dilation, for each true (e.g., indicating build material should be deposited) voxel in a mask or print data, every voxel surrounding or adjacent that true voxel which is false is set to true; this may be done out to a certain thickness, so integer X voxels adjacent to the true voxel, in each direction, are set to true. In dilation, typically, voxels or areas that are changed to indicate material should be printed are connected to, contiguous with, or adjacent to the relevant voxel or boundary. In contrast, with a fill function, voxels or areas that are changed to indicate material should be printed are not necessarily connected to, contiguous with, or adjacent to the relevant voxel or boundary.

In one embodiment this may be iterative: the resulting Completemask may be analyzed again for weakness, and the process may be done again until all of the model is above StrThres.

Another embodiment to strengthen a mask may be similar to the previously discussed process, but with dilation function of the type:

DilationFun(WeakMask, StrAn)

This process may dilate WeakMask depending on the StrAn (the weaker the region, the more dilation it will "get").

Another embodiment to strengthen a mask may be similar to the previously discussed processes, but using, instead of the MorphoFun defined as a dilation function, it is a morphological fill function defined as:

MorphoMask=FillFun (WeakMask)

One simple embodiment may strengthen a model by thickening boundaries. One embodiment may define a dilation with a spherical element with radius R as A (+) R. To obtain a model which is close to the anatomy as possible on one hand and printable on the other, the dilation may be in the direction which is "not important" to the model or to the use of the model.

FIGS. 7A, 7B and 7C show a model before (7A, initial) and after (7B, initial dilation, 7C outward dilation) dilation. For initial thin model 700 shown in FIG. 7A, one option to thicken the model may be to dilate it inwards. This way the model may be accurate regarding the outer bounds while it will also be thick enough. This can be used if the outer structure of the model is of importance (in the example of FIG. 7, the size and structure of the aorta is important). The opposite is possible, dilation outwards so the inner structure is accurate. As shown in FIG. 7C, this may be needed if a device (e.g. medical tool) should be inserted into or inside the printed model, and only the dimensions of the inner structure should be kept.

Filling of Voids

Figure 4B:
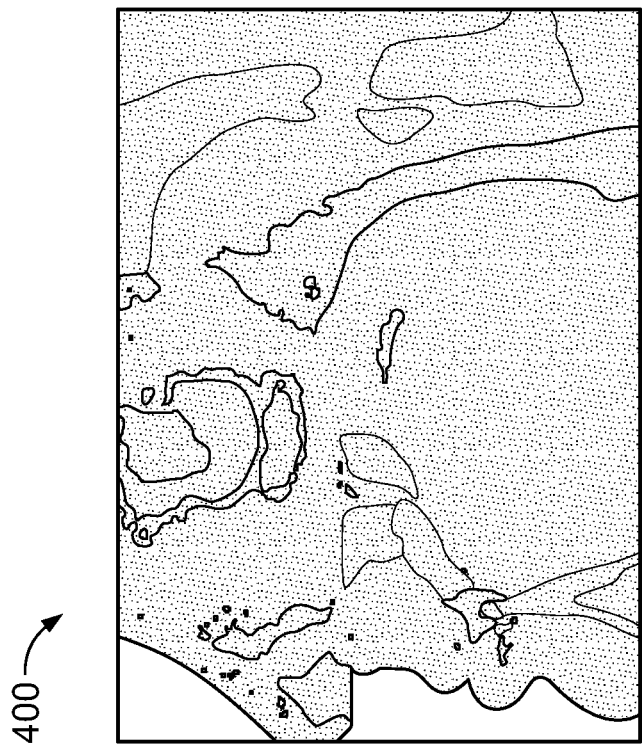
FIGS. 4A and 4B show a two-dimensional (2D) representation of a 3D volume having voids shown in FIG. 4A, filled to result in the volume shown in FIG. 4B according to one embodiment of the invention.
Figure 4A:
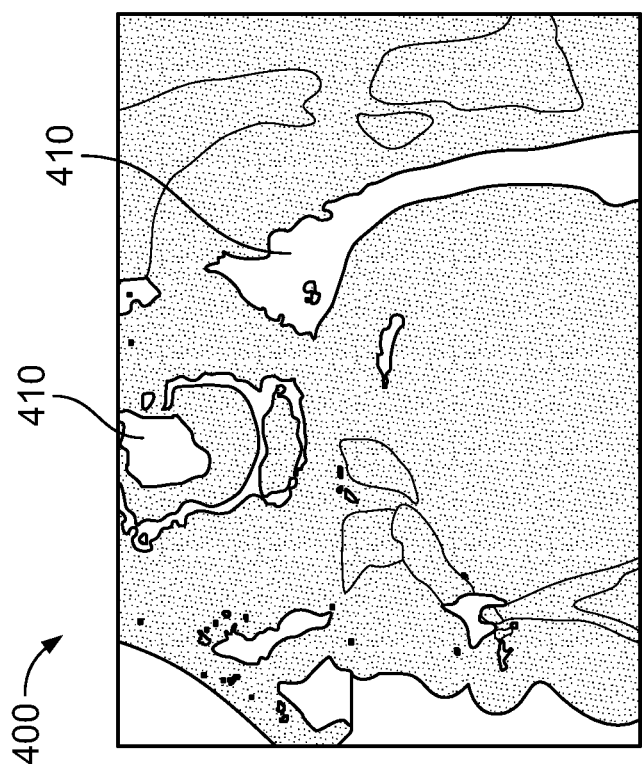

In one embodiment, initial processing or segmentation (e.g., operations 310 or 320) or adjustment or post-processing (e.g. operations 340 or 350) may include filling voids, which may be portions of a 3D object which are hollow and where no print material is deposited. For example, a filling algorithm may be used to obtain or create more robust structures. One example filling action is shown in FIGS. 4A and 4B, show a 2D representation of a 3D volume 400 having voids 410, shown in FIG. 4A, filled to result in the volume shown in FIG. 4B. The mask representing volume 400 may have its data altered to convert void data to printed material data.

In some embodiments, a user and/or known segmenting tools or algorithms may decide which region to fill, and a fill algorithm or method may then fill the region, e.g., as part of operations 310 or 320 above. For example, if a module designed for segmenting a specific type of structure such a bone is used, and the module determines a void exists in a segmented bone, the module may use a known fill algorithm. A user may use a graphical user interface, click on or select a region to be filled, and a known fill algorithm may then fill the region.

In some embodiments, after segmentation or initial segmentation (e.g., operation 310 above) and possibly other processes (e.g. initial processing 320 described above) an automatic process may determine (e.g. evaluation 330 described above) that regions need to be filled, e.g., to improve strength. Filling may then be done as part of e.g. adjustment, operation 340 above.

In one example implementation, the filling mask process can be performed by filling each of a number of slices or sections (e.g., flat or relatively planar sections making up the volume) separately using any function well known in the art for image filling. Such a function can be for example the Matlab function imfill: BW2=imfill(BW,'holes'). This function may fill holes in the input binary image BW, where a hole is a set of background pixels that cannot be reached by filling in the background from the edge of the image. BW may be the original mask in specific slice (e.g. a 2D mask).

While a 3D fill may be a simple action (e.g., fill the current or all voids) it may be hard for the user to predict the outcome if performed on a fully 3D volume. If a void has a small hole, the outcome of a 3D fill may be to fill the entire volume. An embodiment which instead performs a 2D fill on each slice may be more contained, and may fill only the region of interest. This action could be done in any direction, e.g., axial fill, and going over all z-slices, or sagittal fill. One embodiment is performed on the axial orientation because for some applications it works well for most of the cases.

Removing or Creating Borders, Erosion

In one embodiment, initial processing, segmentation, or post-processing may include removing borders, or creating a gap or separation area, between touching masks, e.g., eroding at the border, or creating gaps or gap areas, with for example the width of printer resolution, or according to printer definition data. As with other processes, the removal of material may be done by altering masks to change "print" portions to "not print", for example altering a mask so that a gap is defined by no material being printed, e.g. a zero. Printer definition data may be used as an input to determine a minimal printer resolution unit which determines the width of the gap. This may be done for example to remove parts that are touching or contiguous, per a mask, but for which it is desired to have the parts not touch, or be separated, after printing: the parts may be artificially separated by manipulating the data. This may be done for example when there is a void or physical separation in fact, in the imaged objects, but where printer resolution may cause the parts to touch or be contiguous, per a mask, and it is desired to have the parts not touch, or be separated, after printing. Masks that are touching each other may be identified and have material eroded to prevent the touching. In one embodiment an algorithm may determine that there is a void or gap between different areas of masks, and as a result determine that this void should be kept in the printed 3D model.

In some embodiments, a user and/or known segmenting tools or algorithms may decide which borders or material to remove, and an appropriate known algorithm or method may then remove or erode material, e.g., as part of operations 310 or 320 above. For example, if a module designed for segmenting a specific type of structure such a bone is used, and the module determines that contiguous areas are different bones, the module may use a known erosion algorithm. A user may use a graphical user interface, click on or select regions to be separated, and a known erosion algorithm may then separate the regions. Erosion may be performed as part of post-processing 350.

A mask may have a complex structure such that there are small gaps between adjoined regions. This could be the case also if different masks are printed from the same model (e.g., one mask for a tooth, and another mask for a mandible) and they are very close to each other or touching. The result of this may be a 3D model with connected or touching masks or connected or touching parts of the same mask in a region where no connection should appear if a separable model is desired (e.g., different parts of a heart). If the 3D printer resolution is known, a minimal difference between the segmented parts can be determined. Physically contiguous heart chambers may, in the final 3D printed object, be divided or separated by narrow gaps where no build material is deposited, such that the physically connected (in real life) heart chambers can be taken apart by a person examining the final build job.

Layer thickness and printer tolerance may make up the printer resolution. If it is desired to separate parts printed as one batch or print job, the minimal difference between masks should in one embodiment be the printer resolution. If this is known during a POS process, the distance (in the imaging volume: e.g., in the voxel world, the volume or imaging world) between segmented parts may be altered. In some embodiments, default parameters (e.g., printer parameters, material, etc.) may be used, not necessarily tied to an actual printer or material, which may improve segmentation and/or 3D printing over processes not accounting at all for printer or materials.

Figure 5B:
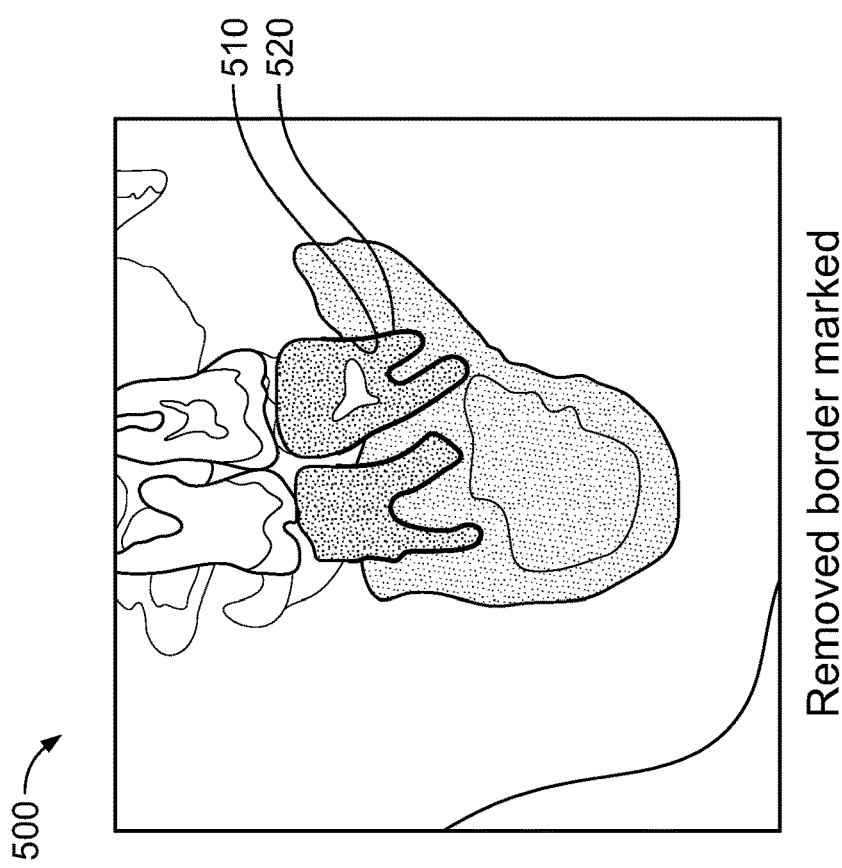
FIGS. 5A and 5B show a 2D representation of a 3D volume having borders between teeth and a mandible, shown in FIG. 5A, removed to create gaps in FIG. 5B according to one embodiment of the invention.
Figure 5A:
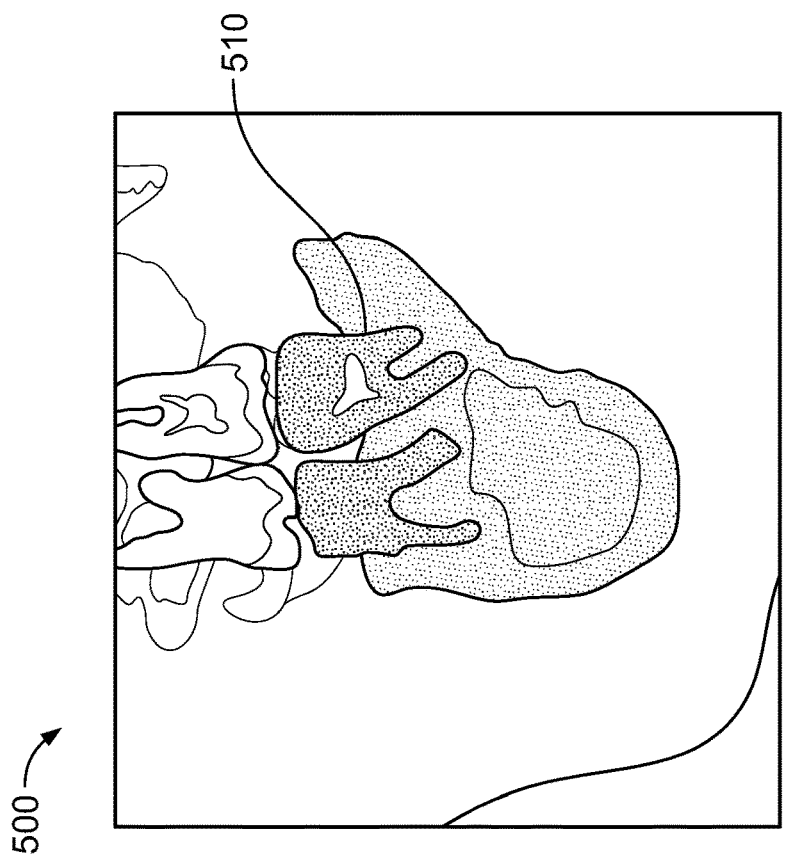

FIGS. 5A and 5B show a 2D representation of a 3D volume 500 having borders 510 between teeth 520 and mandible 530, shown in FIG. 5A, removed or eroded to create gaps or gap areas 520 in FIG. 5B, the gaps representing parts of the 3D model where no material is printed. The mask representing volume 500 may have its data altered to convert border data to non-printed material or gap data.

For example, if MaskA and MaskB are two adjacent masks (e.g., in FIG. 5, a tooth and mandible), both masks may be printed with a printer with spatial resolution of R=Rx,Ry,Rz. In one embodiment Rx and Ry are the printer accuracy or tolerance and Rz is layer thickness. Printer accuracy is typically defined in the X and Y directions. The mask may not be aligned in terms of rotation and its axial direction or x/y/z axes with the printer axial direction or x/y/z axes and correction or rotation may need to be performed, for example using a rotation transformation matrix T. For example, the X direction in the printer could be aligned with the Z direction of the mask. Because the erosion function (e.g., the function on the mask removing material and creating a gap) may be using R (from the printer), the wrong parameters could be obtained. The correct way to write it may be: the printer has spatial resolution of R=R'x,R'y,R'z. R=T(R') when T is the Rotational transformation matrix between the mask and the printer.)

To produce a printed model which MaskA and MaskB are separated, a morphological operation may be performed. For example, a morphological operation may take the mask(s) and by a convolution with some object (in the particular example below a sphere with radius R) create a new mask, as is known in the art.

For example, in one embodiment if it is defined:
Erosion with spherical element of radius R (denoted herein as "A⊖R")
MaskA/\'=MaskA⊖R
MaskB/\'=MaskB⊖R MaskA' and MaskB' are the closest or most similar masks to MaskA and MaskB which could be printed with a printer with tolerance R. For example, if given a printer's specifications the smallest amount of material is removed from MaskA and/or MaskB at their border such that they do not physically touch when printed, it may mean that MaskA' being the most similar mask to MaskA given the printer and that material has been removed. As with other changes discussed herein, this typically means modifying the data structure(s) (e.g., mask(s)) defining the objects. In one embodiment operations such as the following may be used:

Define DistX=bwdist(MaskX) according to a Matlab function which creates a distance map DistX from the edge of MaskX. Bwdist may compute the Euclidean distance transform of the binary image BW. For each pixel in BW, the distance transform may assign a number that is the distance between that pixel and the nearest nonzero pixel of BW.

R may be the tolerance of printer (assuming equal in all directions)

MaskA and MaskB—are two masks that should be separated by distance R. In order to create two masks MaskA' and MaskB' which are separated by R perform operations such as:
DistA=bwdist(MaskA)
DistB=bwdist(MaskB)
MaskA'=MaskA & DistB>R/2 (& is the "and" operation)
MaskB'=MaskB & DistA>R/2

Creation of Voids/Thinning

In one embodiment, segmentation 310 or initial processing 320 may include creating 3D printer input data which for example may include creating a void or hollow area in a solid area according to the printer definition data, or thinning areas in printer definition data, or otherwise removing material. Typically, material is removed to reduce the amount of material used (e.g., reducing cost, reducing waste, making printing faster), or to reduce weight, or for other reasons. The material may be removed up to a point such that strength or stability is not compromised.

Regions that should be made hollow or have voids may be detected or identified using known algorithms to identify connected component regions, which may include any chunk or region of a 3D object which is not touching other chunks or regions of masks. In one embodiment any such chunk or region should be hollowed.

If an area of a segmented region, mask or 3D printer input data is solid or completely filled, and the solid area of material is not necessary, printing material may be wasted on the inner region. Typically such unnecessary or redundant fill areas are internal, and have no border to an external area of the printed object. If it is known that this model is to be used for printing, the already filled area could be holed or have voids or empty spaces (with no build material) created, thus having build material removed, to a minimal thickness, for example as follows:

CompleteMask may be turned into or transformed into an outer shell mask (e.g., ShellMask) with small boundary thickness (e.g., InitThick).

CompleteMask may be the mask after "regular" segmentation, and is desired to be hollowed. ShellMask (e.g. a Boolean mask or matrix) is the outer shell of CompleteMask, e.g. it is true (e.g. 1) only on the outer shell of CompleteMask. ShellMask may have a wall thickness of InitThick (e.g. 1 mm) in the beginning of the process. ShellMask may be dilated, or made wider or thicker, where necessary (for example depending on a strength analysis such as StrAn).

Then, strength analysis (e.g., StrAn) may be done on ShellMask.

In some embodiments, after thinning and evaluation (e.g., operation 330) if the model is determined to be too weak or not printable, a corrective thickening or dilation may be performed, e.g., using dilation via a DilationFun function, methods disclosed herein for increasing thickness of sections of the printer input data, or other methods, but typically only to the inner part (e.g., the part of the model not facing the external world) of the mask.

One option to understand what is the inner part of the model is to take the CompleteMask and compute the gradient over the distance transform from the edge.

D=bwdist(~CompleteMask) (e.g., use Matlab bwdist function of the negative of CompleteMask).

Gradient(D)—Matlab gradient function of the distance transform will give the outer direction. The other direction is inward.

One embodiment includes removing part of the inner mask which is not important for the structure of the model, which reduces printing material, but which also keeps the strength of the model. In addition, removing material, adding material or other processing may be performed repeatedly or iteratively in conjunction with quality, printability or strength evaluation, to determine how much material to remove. In this manner a "simulation" may be performed. For example an aorta which is filled according to an initial model or mask may have a section of its inner part removed. This may be fed back into operation 330 described above, where the output or masks may be evaluated for, for example, strength. This may be repeatedly or iteratively performed until the model strength is reduced below a threshold, e.g. there is at least one region in Heatmap<StrThres. In such an embodiment, the previous iteration or version of step (e.g., when all Heatmap is still>=StrThres) is the model with the least amount of material possible which keeps the required strength and structure. Printer definition data may be input into the void creation process, or into a thickening or thinning process (and thus these processes may be performed according to printer definition data), by having the strength analysis of printability analysis which occurs after void creation, thickening or thinning use printer definition data.

In some embodiments, iteration when removing (e.g., thinning, creating gaps or creating voids) may include iterating until an evaluation (e.g. operation 330 above) determines that the model or mask is too weak and then using the previous iteration determined to be printable as the model. In other embodiments, iteration when removing may include iterating until an evaluation determines that the model or mask is too weak and then using a thickening process in conjunction with an evaluation process to create a printable mask or model.

Other methods may be used.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention. Various embodiments have been presented. Each of these embodiments may of course include features from other embodiments presented, and embodiments not specifically described may include various features described herein.

The invention claimed is:

1. A method for converting creating three-dimensional (3D) objects, the method comprising:
   receiving imaging data describing a three-dimensional volume;
   segmenting the imaging data to produce one or more three-dimensional masks, each three-dimensional mask comprising a three-dimensional matrix indicating where material should be printed and where material is not printed;
   using data describing a particular printer, evaluating the one or more three-dimensional masks for printability;
   if the evaluation determines the one or more masks are not printable, adjusting the one or more three-dimensional masks and repeating the evaluating operation; and
   if the evaluation determines the one or more three-dimensional masks are printable, creating data to be input to a printer for printing the objects.

2. The method of claim 1 comprising printing the 3D object using the data to be input to a 3D printer.

3. The method of claim 1 wherein adjusting comprises increasing or decreasing thickness of sections to be printed.

4. The method of claim 1 comprising adjusting the resolution of the one or more three-dimensional masks.

* * * * *